April 17, 1928.  1,666,711

A. A. MacDONALD

ROLLING MILLING TOOL

Filed March 14, 1927

A. A. MacDonald  Inventor

By Jesse R. Stone

Attorney

Patented Apr. 17, 1928.

1,666,711

UNITED STATES PATENT OFFICE.

ARCHIE A. MacDONALD, OF LOS ANGELES, CALIFORNIA, ASSIGNOR TO HUGHES TOOL COMPANY, OF HOUSTON, TEXAS, A CORPORATION OF TEXAS.

ROLLING MILLING TOOL.

Application filed March 14, 1927. Serial No. 175,143.

My invention relates to milling tools such as are employed in well drilling operations, where it becomes necessary to cut up and remove metal objects, such as tools and pipe, from the well. It is primarily a metal-cutting tool and is not adapted for efficient earth boring operations.

In well drilling, metal objects connected with the drilling apparatus, sometimes becomes loosened and dropped to the bottom of the well. Most such tools are of particularly hard tough steel, which cannot be easily ground up by a milling tool of the ordinary scraping type. Such objects are termed "junk" and may move around with the scraping teeth on the bottom of the hole, and it is usually an exceedingly difficult operation to grind the steel objects up so that the flushing fluid will wash the particles away.

I contemplate the provision of a milling tool of the usual scraping type, having rolling cutters thereon, whereby the junk in the well can be more effectively cut to pieces for removal.

It is an object to provide a tool which can be made cheaply and the rolling cutters mounted securely therein so as to obviate any danger of breaking in use.

Figure 1:
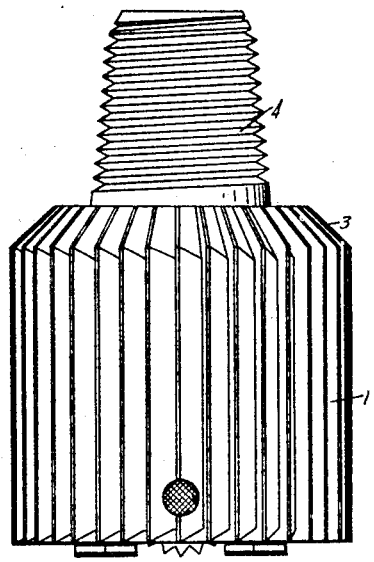
Figure 2:
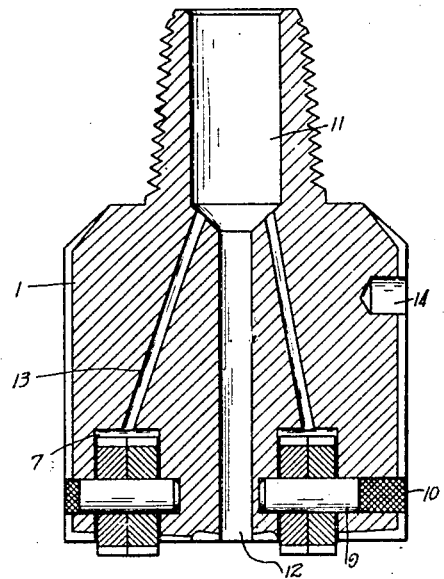
Figure 3:
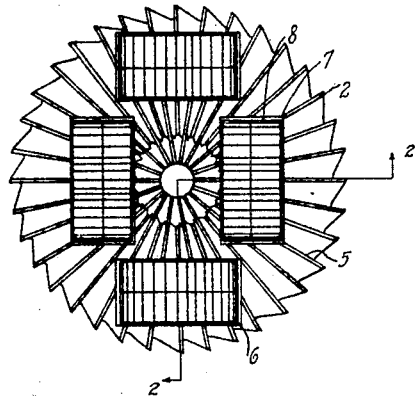

Referring to the drawing herewith, Fig. 1 is a side elevation of my improved milling tool. Fig. 2 is a vertical section, the section being taken on line 2—2 of Fig. 3. Fig. 3 is a bottom plan view of the invention.

The body 1 of the tool is similar to that of the usual milling tool. It is cylindrical in shape, with teeth 2, cut longitudinally thereof said teeth being inclined forwardly in the direction of rotation of the cutter. The upper end is tapered at 3 and toothed as in case of the cylindrical surface. The tool has an upper threaded connection for a drill collar. This connection may be a socket or shank as desired and I have shown a shank 4 threaded for engagement with the collar—not shown.

The lower face of the head is also provided with scraping teeth 5, formed radially thereon in the usual manner. Within the said lower face are a plurality of pockets or recesses. I have provided two such pockets 6 set opposite each other adjacent the outer edge of the head and two pockets 7 set inwardly adjacent the center of the head.

Rolling cutters 8 are mounted in each of said pockets, said cutters being two in number, rotatable upon bearing pins 9 set transversely of said pockets. Said pins are introduced into position through radial openings in the side of the head, the outer ends of said openings being then closed by metal plugs 10 welded into the head and securely holding the pins in place. The cutters 8 are cylindrical and provided with cutting teeth thereon projecting beyond the face of the head as shown in Figs. 1 and 2.

The head has a chamber 11 in its upper shank to receive the flushing fluid. From this chamber an axial passage 12 allows the flow of fluid to the forward face of the tool. Smaller branching passages 13 conduct the fluid directly to the cutter pockets to discharge upon the cutters and keep them free of accumulations of material. A radial recess 14 may be formed in the head, as shown, to receive a pin to assist in screwing the head into the drill collar in assembling the tool.

A milling tool of this character will roll upon and disintegrate the junk in the well more effectively than an ordinary scraping tool. By mounting the cutters as indicated the pins are securely held from removal. It has been found that the pins will last as long as the cutting faces of the rolling cutters, and when the old cutters are removed and replaced, the pins can also be replaced by new ones.

Having thus described my invention, what I claim as new, and desire to protect by Letters Patent is:

1. A milling tool for deep well operation, comprising a cylindrical head having its entire periphery formed into cutting teeth, said teeth having their forward faces radial and their outer faces inclined from the cutting edge inwardly, scraping teeth on the forward end of said head, said forward end having pockets therein, and rolling cutters mounted on radial axes within said pockets.

2. A milling tool for deep well operation, comprising a cylindrical head, teeth cut to cover the periphery of said head, scraping teeth extending radially from the center of the forward end of said head, said forward end having pockets formed therein, and rolling cutters in said pockets projecting in advance of said head.

3. A milling tool for deep well operation, comprising a cylindrical head, teeth cut to cover the periphery of said head, scraping teeth extending radially from the center of the forward end of said head, said forward end having pockets formed therein, and rolling cutters in said pockets projecting in advance of said head, said cutters being mounted in opposite pairs and rotatable on axes radially of said head.

In testimony whereof, I hereunto affix my signature, this the 1st day of March A. D. 1927.

ARCHIE A. MacDONALD.